United States Patent Office 3,784,673
Patented Jan. 8, 1974

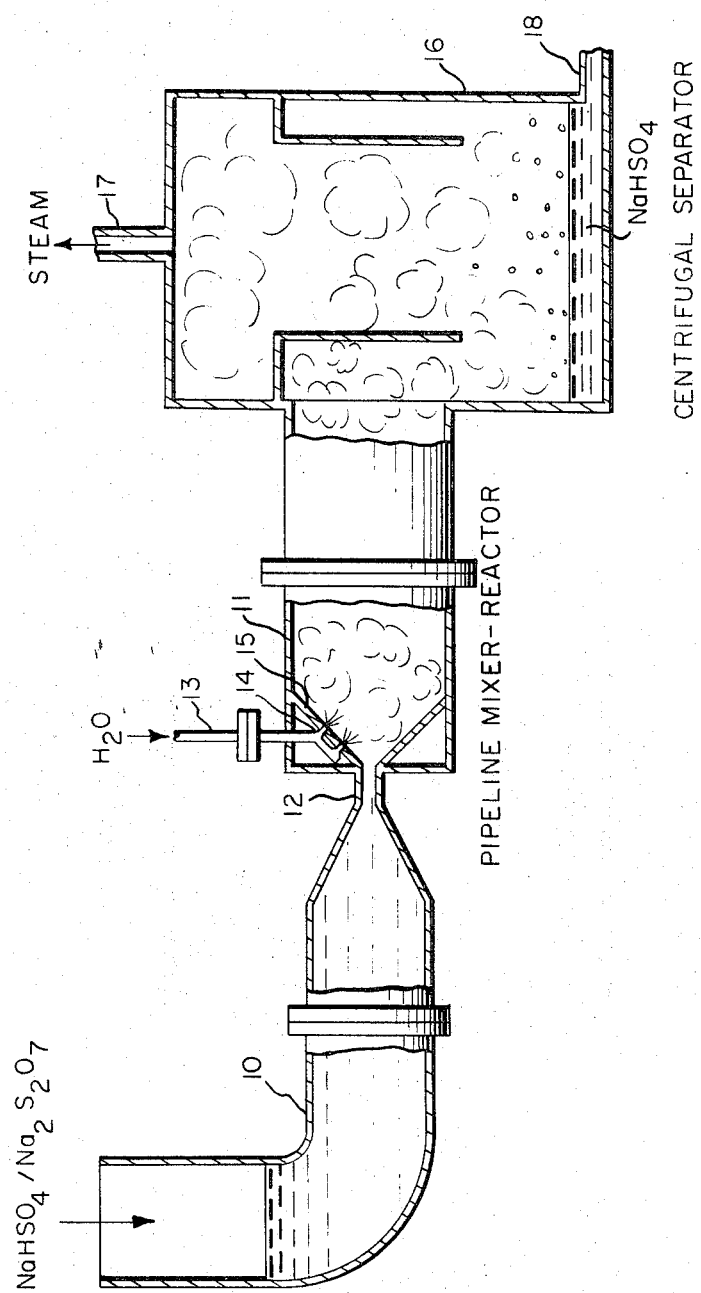

3,784,673
PROCESS FOR TREATING SODIUM BISULFATE
Wilson Stewart Cathcart, Cleveland, Ohio, assignor to E. I. du Pont de Nemours and Company, Wilmington, Del.
Filed May 25, 1972, Ser. No. 256,971
Int. Cl. C01d 5/02
U.S. Cl. 423—203                          5 Claims

ABSTRACT OF THE DISCLOSURE

An improved process to cool and rehydrolyze a melt mixture of sodium bisulfate and sodium pyrosulfate to sodium bisulfate is provided. The process comprises feeding water and the melt into a pipeline mixer having a reaction zone, the water fed at a pressure sufficient to atomize the water in the mixer and attain mixing of the water and melt, and the melt mixture fed through a venturi into the mixer at a temperature of at least 220° C. and at a pressure sufficient to seal the venturi throat against back pressure of steam formed in the reaction zone within the mixer. Thus, rehydrolyzation of the sodium pyrosulfate to sodium bisulfate occurs and sodium bisulfate is withdrawn from the reaction zone for further processing.

BACKGROUND OF THE INVENTION

Field of the invention

This invention relates to processes for the water treatment of melts of sodium bisulfate and sodium pyrosulfate.

Prior art

Sodium bisulfate is manufactured commercially from salt and sulfuric acid at elevated temperatures. The reaction yields other sulfates, but at temperatures over 220° C. it also produces sodium pyrosulfate which requires rehydrolyzation to sodium bisulfate as illustrated by the following equilibrium reaction:

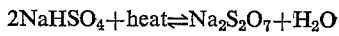

$$2NaHSO_4 + heat \rightleftharpoons Na_2S_2O_7 + H_2O$$

As practiced in the art, the hot melt mixture of sodium bisulfate and sodium pyrosulfate made at about 300° C. is mixed with water in a large tank and mechanically stirred. Steam is given off at the surface and the temperature of the hot melt drops with a resultant shift in the equilibrium to sodium bisulfate. The bisulfate is further treated to reduce color and then discharged.

SUMMARY OF THE INVENTION

According to the present invention there is provided an improved process of treating a melt of sodium bisulfate and sodium pyrosulfate with water to attain essentially complete rehydrolyzation of the sodium pyrosulfate to sodium bisulfate by combining water and the melt in a pipeline mixer having a reaction zone, said water fed at a pressure sufficient to atomize the water in the mixer to attain intimate mixing of the water and the melt, said melt fed through a venturi into the mixer at a temperature of at least about 220° C. and at a pressure sufficient to seal the venturi throat against back pressure of steam formed in the reaction zone. Sodium bisulfate is continuously withdrawn from the reaction zone.

BRIEF DESCRIPTION OF THE DRAWING

The drawing is a schematic flow diagram of the present process showing the pipeline reactor and centrifugal separator.

DETAILED DESCRIPTION OF THE INVENTION

The present invention provides an improved one-step process for cooling and rehydrolyzing a hot melt mixture of sodium bisulfate and sodium pyrosulfate, which has been made at a temperature greater than about 220° C., to sodium bisulfate. If the formation reaction has been carried out at a temperature less than about 220° C., rehydrolyzation is not required.

The liquid melt, at a temperature greater than about 220° C., preferably in the range of about 300 to 330° C., continuously flows by gravity through conduit 10 into a pipeline mixer-reactor 11. At the entrance to the mixer, the melt mixture passes through a venturi 12 with sufficient pressure to offset the resistance of the venturi throat to flow. This resistance, of course, will vary with throat diameter and the mixture flow rate. Generally, the melt pressure will be in the range of about 6 to 24 inches of water. For example, for a mixture flow rate of 15 gallons per minute, a fluid head of about 10 inches of water is needed to move the mixture through a throat 1.25 inches in diameter and a head of about 20 inches of water is needed to move it through a 1-inch throat. The mixture flow rate can be in the range of about 4 to 30 gallons per minute. For a usual melt mixture flow rate in the range of about 10 to 20 gallons per minute the venturi throat diameter will be in the range of 1 to 1.25 inches in diameter.

Once through the throat, water, under pressure sufficient to atomize it, continuously enters the mixer-reactor 11 from a line 13 through at least 1 jet but preferably a plurality of jets 14. The size and number of jets for the water injection control the water pressure required. For the above-mentioned example of a melt mixture flow rate of 15 gallons per minute, water pressure across 8 jet holes about 0.06 inch in diameter will be about 45 pounds per square inch gauge. Usually, for a melt mixture flow rate as described above, the water pressure will be in the range of 40 to 65 pounds per square inch gauge. While the water can be at any temperature as long as it is not steam, it is sufficient for it to be fed at an ambient temperature in the range of 20 to 30° C. The amount of water used will, of course, depend upon a number of variables, e.g., the temperature of manufacture and the temperature of the melt fed the mixer-reactor and whether the water is needed for both cooling and rehydrolyzation or just rehydrolyzation. Generally, water supplied at a flow rate in the range of 0.5 to 4 gallons per minute is sufficient.

The main point of the jet energy of the water stream is to insure effective, intimate mixing with the melt. It is usually fed into the reactor on the downstream end 15 of the venturi by passing through a plurality of jet holes in the downstream surface of the venturi throat. On contact with the melt mixture, the water turns to steam and an increment of it enters the mixture to cause an instantaneous rehydrolyzation of the sodium pyrosulfate to sodium bisulfate. The equilibrium of the reaction is such that substantially all of the pyrosulfate is rehydrolyzed at a temperature of approximately 220 to 230° C. Mixer-reactor 11 is long enough to insure sufficient hold-up time for complete reaction.

The generated steam also serves to cool the melt mixture. After rehydrolyzation and cooling in the mixer-reactor 11, the sodium bisulfate and steam mixture continuously exits the reactor at essentially atmospheric pressure into centrifugal separator 16 where this mixture is separated into gas and liquid phases. Steam is vented through line 17 and the liquid sodium bisulfate melt is collected and exits through a bottom outlet 18—from whence it continues through the process in a normal manner.

Advantages of the present process include reduced equipment size and space, and smoother and cleaner operation.

What is claimed is:
1. In a process of treating a melt of sodium bisulfate and sodium pyrosulfate with water, the improvement comprising: (a) feeding water and the melt into a pipeline mixer having a reaction zone, said water fed at a pressure sufficient to atomize the water in the mixer and attain intimate mixing of the water and the melt, said melt fed through a venturi into the mixer at a temperature of at least about 220° C. and at a pressure sufficient to seal the venturi throat against back pressure of steam formed in the reaction zone; (b) rehydrolyzing sodium pyrosulfate to sodium bisulfate in the reaction zone; and (c) withdrawing sodium bisulfate from the reaction zone.

2. The process of claim 1 wherein the temperature of the melt is in the range of about 220 to 330° C.

3. The process of claim 2 wherein the water pressure is in the range of about 40 to 65 pounds per square inch gauge, the water is at a temperature in the range of about 20 to 30° C. and the melt pressure is in the range of about 6 to 24 inches of water.

4. The process of claim 3 wherein the water flow rate is in the range of about 0.5 to 4 gallons per minute and the melt flow rate is in the range of about 4 to 30 gallons per minute.

5. In a process of treating a melt mixture of sodium bisulfate and sodium pyrosulfate made at a temperature greater than about 220° C. with water to attain essentially complete rehydrolyzation of the sodium pyrosulfate to sodium bisulfate, the improvement comprising: (a) continuously feeding the melt through a venturi into a pipeline mixer having a reaction zone, said melt at a temperature in the range of about 300 to 330° C. and at a pressure of about 6 to 24 inches of water; (b) continuously feeding water at a temperature in the range of about 20 to 30° C. and at a pressure of about 40 to 65 pounds per square inch gauge through a plurality of jet holes on the downstream surface of the venturi throat into the mixer; (c) continuously reacting sodium pyrosulfate to sodium bisulfate in the reaction zone; and (d) continuously withdrawing liquid sodium bisulfate from the reaction zone at essentially atmospheric pressure.

References Cited
UNITED STATES PATENTS 3,690,825   9/1972   Ott _____ 423—520 X EARL C. THOMAS, Primary Examiner U.S. Cl. X.R.

423—520